United States Patent
Kao et al.

(10) Patent No.: US 6,842,963 B2
(45) Date of Patent: Jan. 18, 2005

(54) PROCESS FOR FINISHING AN END SURFACE OF A NON-CIRCULAR POST

(75) Inventors: Po-Sung Kao, Taichung (TW);
Shih-Chung Chen, Taichung (TW);
Sheng-Jui Chao, Taichung (TW)

(73) Assignee: Asta Optical Co., Inc., Taichung (TW)

( * ) Notice: Subject to any disclaimer, the term of this patent is extended or adjusted under 35 U.S.C. 154(b) by 0 days.

(21) Appl. No.: 10/429,125

(22) Filed: May 2, 2003

(65) Prior Publication Data

US 2004/0111866 A1 Jun. 17, 2004

(30) Foreign Application Priority Data

Dec. 12, 2002 (TW) ........................................ 91135993 A

(51) Int. Cl.⁷ .............................................. B23P 13/04
(52) U.S. Cl. ............................. 29/557; 29/558; 29/423; 29/424; 29/90.01; 451/49
(58) Field of Search ...................... 29/423, 424, 557, 29/558, 90.01; 451/49; 30/169

(56) References Cited

U.S. PATENT DOCUMENTS

| | | | | |
|---|---|---|---|---|
| 3,427,703 A | * | 2/1969 | Baade .......................... | 29/406 |
| 3,750,272 A | * | 8/1973 | Gomond ....................... | 29/558 |
| 6,276,994 B1 | * | 8/2001 | Yoshida et al. ............... | 451/41 |

FOREIGN PATENT DOCUMENTS

JP                03081038 A  *  4/1991  ........... B21D/53/00

* cited by examiner

*Primary Examiner*—Essama Omgba
(74) *Attorney, Agent, or Firm*—Ladas & Parry

(57) ABSTRACT

A process for finishing an end surface of a non-circular post is provided to obtain a good surface precision. The process includes the steps of providing a workpiece having a first end with a first end surface, mounting a filling block around the first end of the workpiece, and surface-finishing the first end surface of the workpiece and an extension end surface of the filling block, which are at least covered by an area bounded by a circular track, by using a cutter.

14 Claims, 8 Drawing Sheets

PROCESS FOR FINISHING AN END SURFACE OF A NON-CIRCULAR POST

CROSS-REFERENCE TO RELATED APPLICATION

This application claims priority of Taiwanese Application No. 091135993, filed on Dec. 12, 2002.

BACKGROUND OF THE INVENTION

1. Field of the Invention

The invention relates to a process for finishing an end surface of a non-circular post.

2. Description of the Related Art

Referring to FIG. 1, a conventional molding core 1 for forming an optical lens piece with a non-circular cross-section includes a surface 101, four lateral sides 102 connected to the surface 101, and a peripheral edge 1011 surrounding the surface 101. A conventional process for finishing the surface 101 of the molding core 1 comprises the steps of rotating the molding core 1, and using a cutter 2 to finish the surface 101 to a predetermined precision.

Although the aforementioned process can achieve its intended purpose, it has the following disadvantages:

Referring to FIG. 2, when a circular track (P1) of the cutter 2 is within the boundary of the peripheral edge 1011 of the molding core 1, the cutter 2 cannot hit the lateral sides 102 of the molding core 1. However, when a circular track (P2) of the cutter 2 exceeds the boundary and intersects the peripheral edge 1011, two continuous portions of the circular track, arc AB and arc CD, and two non-continuous portions of the circular track, arc BC and arc DA, are formed. When the circular track (P2) is at point A or C, the cutter 2 is likely to hit the lateral side 102. When the circular track (P2) is at point B or D, the cutter 2 is likely to move swiftly away from the lateral side 102, thereby resulting in damages not only to the cutter 2, but also to the surface 101 of the molding core 1.

SUMMARY OF THE INVENTION

Therefore, the object of the present invention is to provide a process for finishing an end surface of a non-circular post that is capable of overcoming the aforementioned drawbacks of the prior art.

According to one aspect of the present invention, a process for finishing an end surface of a non-circular post comprises the steps of providing a workpiece having a first end with a first end surface, mounting a filling block around the first end of the workpiece, and obtaining the first end surface of the workpiece and an extension end surface of the filling block, which are at least covered by an area bounded by a circular track, by surface-finishing with a cutter. The workpiece has the first end, a second end opposite to the first end along a rotational axis, and a plurality of lateral sides connected between the first and second ends. A first peripheral edge forms between the first end surface and the lateral sides, and a reference radius, from the rotational axis to the first peripheral edge, is obtained. The cutter surface-finishes the first end surface of the workpiece and the extension end surface of the filling block according to a circular track around the rotational axis. The filling block has an inner side-wall that is fitted tightly to the lateral sides of the workpiece, and the extension end surface that extends continuously and outwardly from and around the inner side-wall and that faces in the same direction as the first end surface. The extension end surface has a second peripheral edge. The distance between each point on the second peripheral edge and the rotational axis is not smaller than the reference radius.

According to another aspect of the present invention, a process for finishing an end surface of a non-circular post comprises the steps of providing a workpiece having a first end with a first end surface, mounting a filling block around the first end of the workpiece, obtaining the first end surface of the workpiece and an extension end surface of the filling block, which are at least covered by an area bounded by a circular track, by surface-finishing with a cutter, and removing the filling block from the workpiece by melting down the filling block. The workpiece includes a post, a covering layer covering one end of the post, the first end, a second end opposite to the first end along a rotational axis, and a plurality of lateral sides connected between the first and second ends. A first peripheral edge forms between the first end surface and the lateral sides, and a reference radius, from the rotational axis to the first peripheral edge, is obtained. The cutter surface-finishes the first end surface of the workpiece and the extension end surface of the filling block according to the circular track around the rotational axis. The distance between each point on the first peripheral edge and the rotational axis is not greater than the reference radius. The filling block has an inner side-wall that is fitted tightly to the lateral sides of the workpiece, and the extension end surface that extends continuously and outwardly from and around the inner side-wall and that faces in the same direction as the first end surface. The extension end surface has a second peripheral edge. The distance between each point on the second peripheral edge and the rotational axis is not smaller than the reference radius.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE INVENTION

Figure 1:
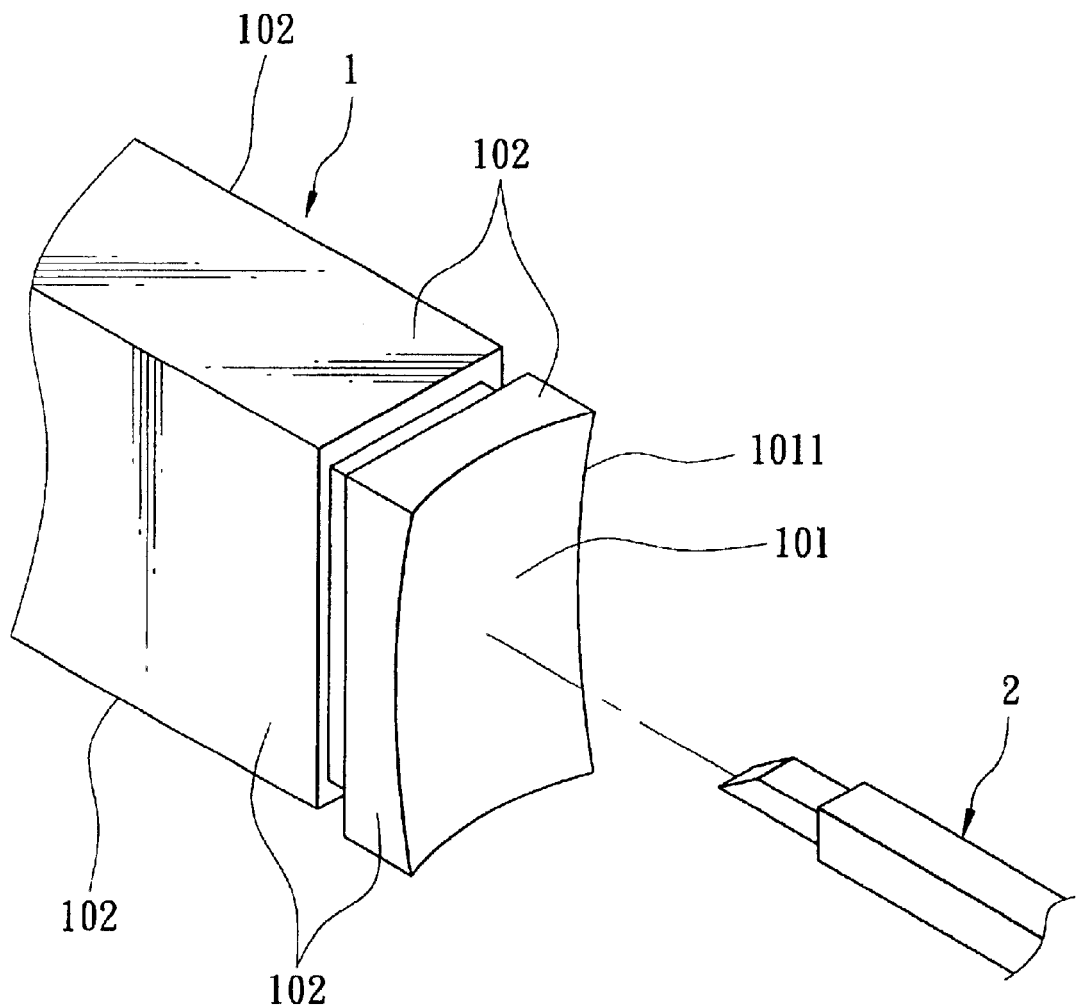
FIG. 1 is a fragmentary perspective view of a conventional process for finishing a surface of a molding core, illustrating a cutter in the process of finishing the surface of the molding core.
Figure 2:
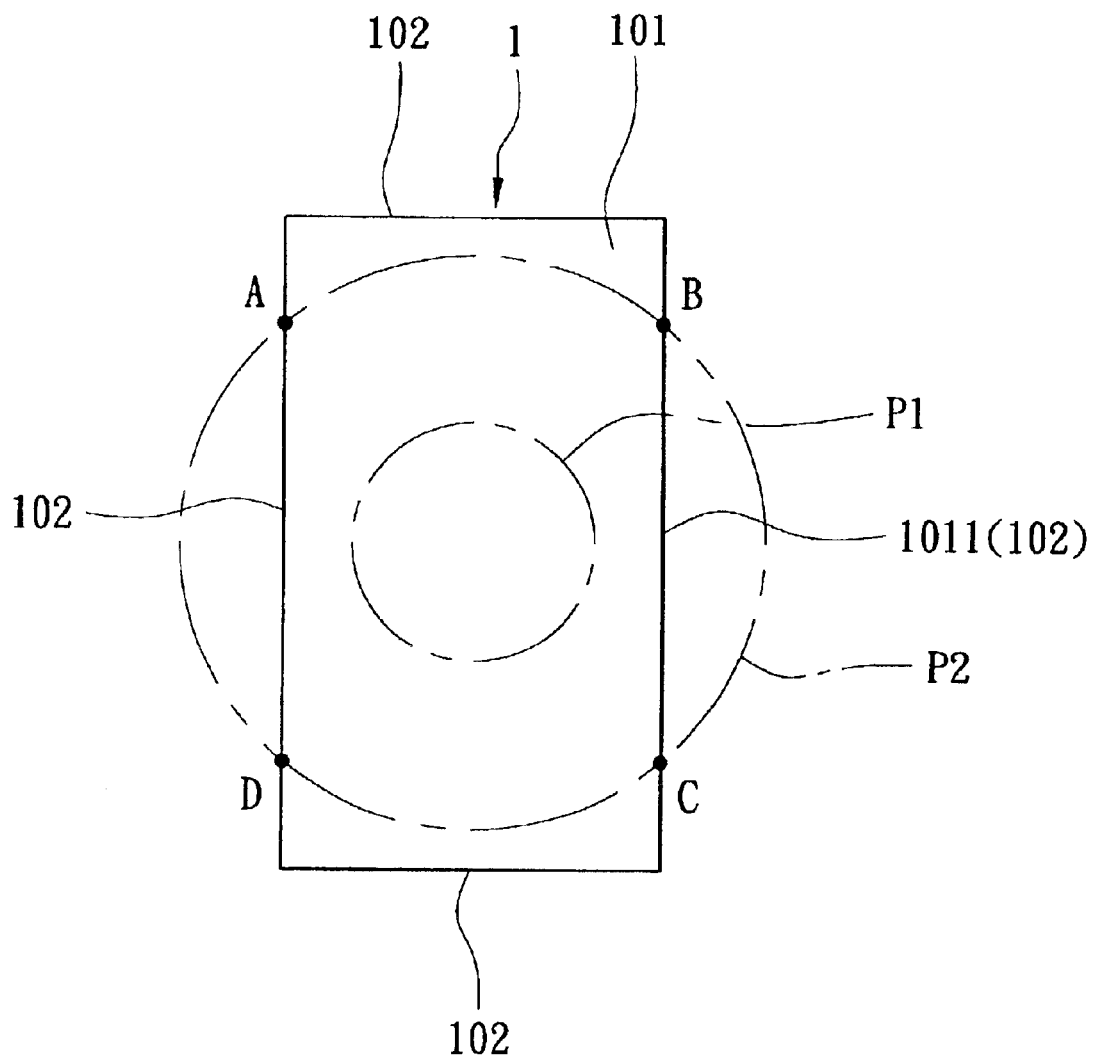
FIG. 2 is a schematic view of the conventional process, illustrating the circular tracks of the cutter on the surface of the molding core.
Figure 3:
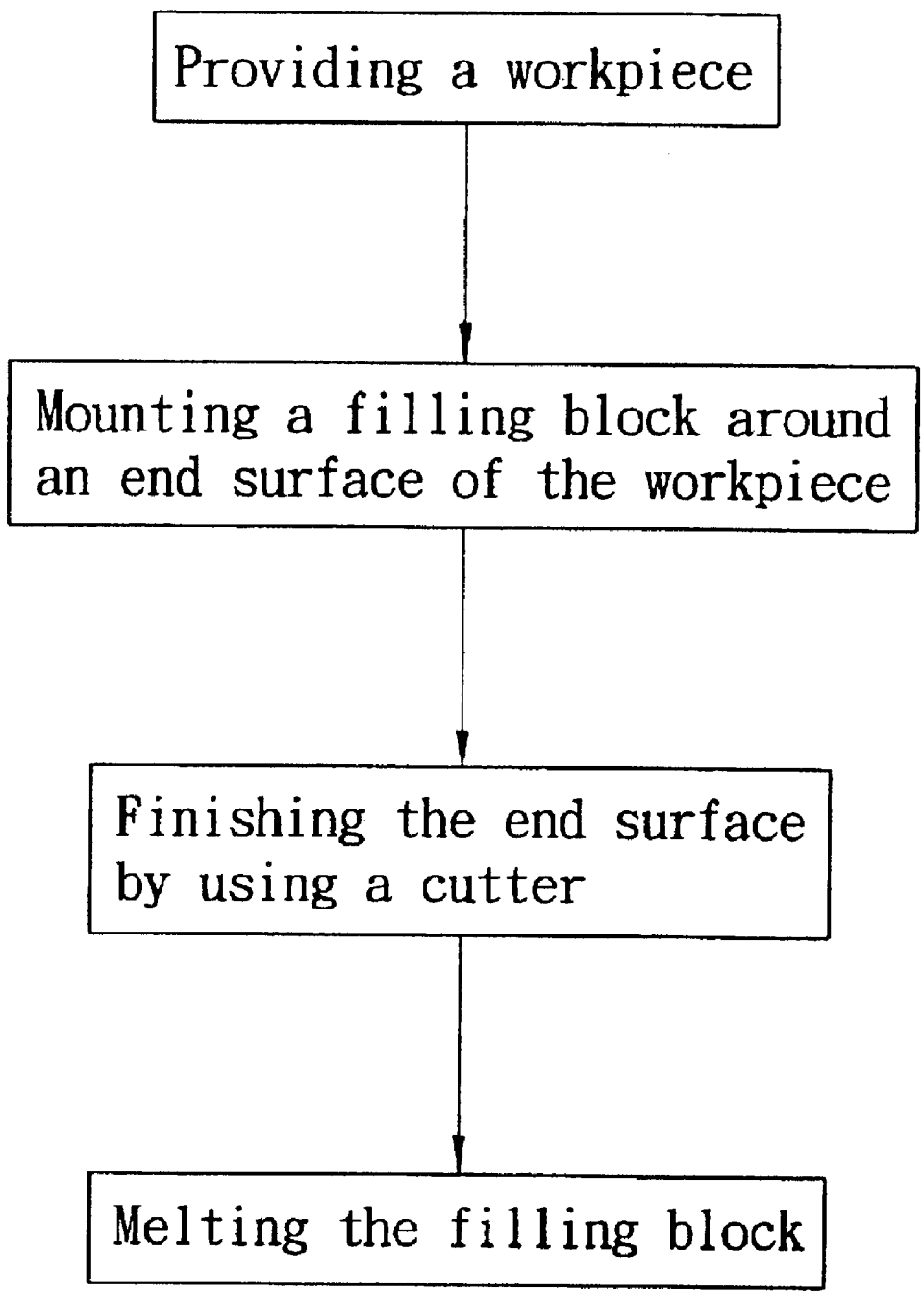
FIG. 3 is a flow chart of the first preferred embodiment of a process for finishing an end surface of a non-circular post according to the present invention.
Figure 4:
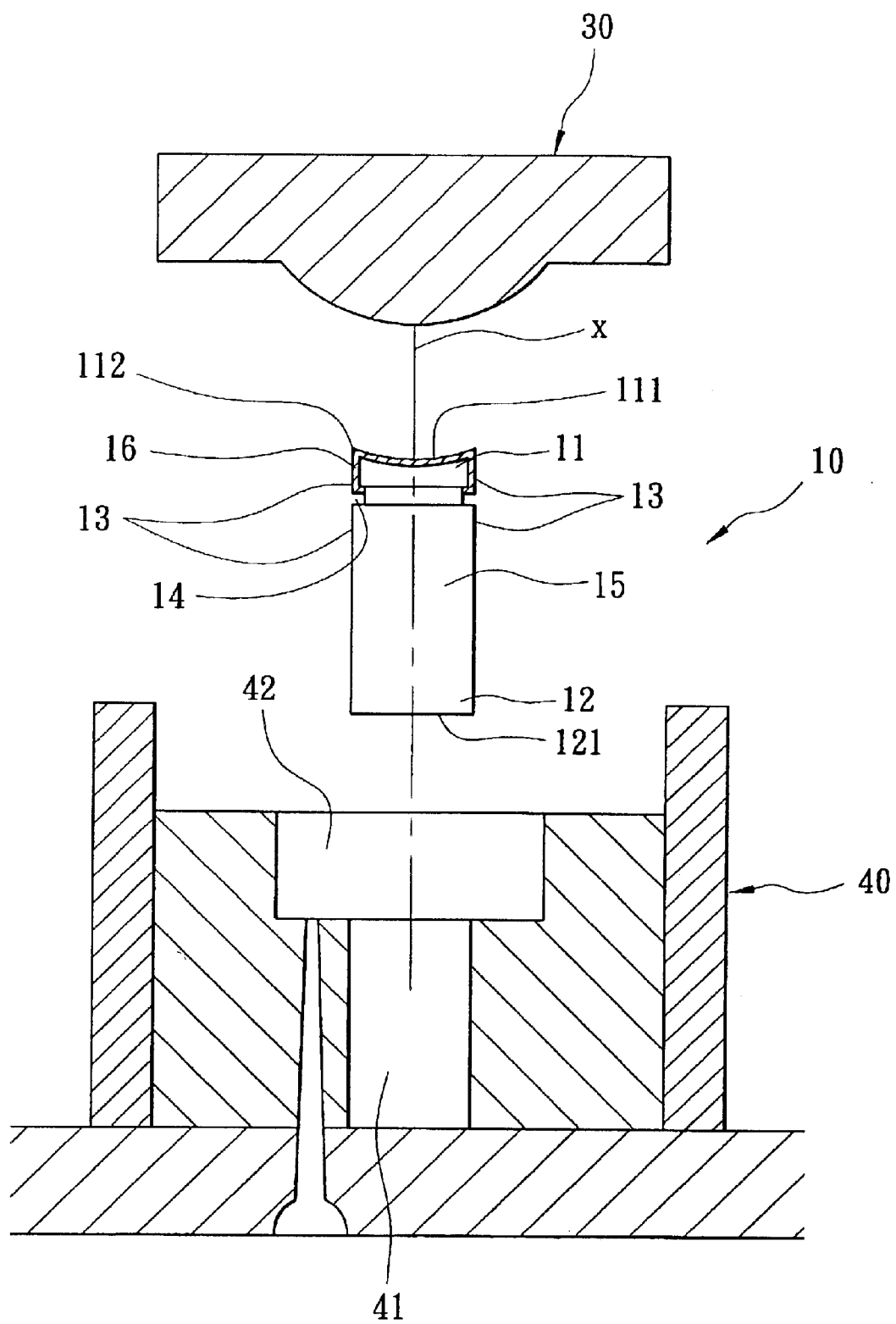
FIG. 4 is a partly exploded sectional view of the first preferred embodiment.
Figure 5:
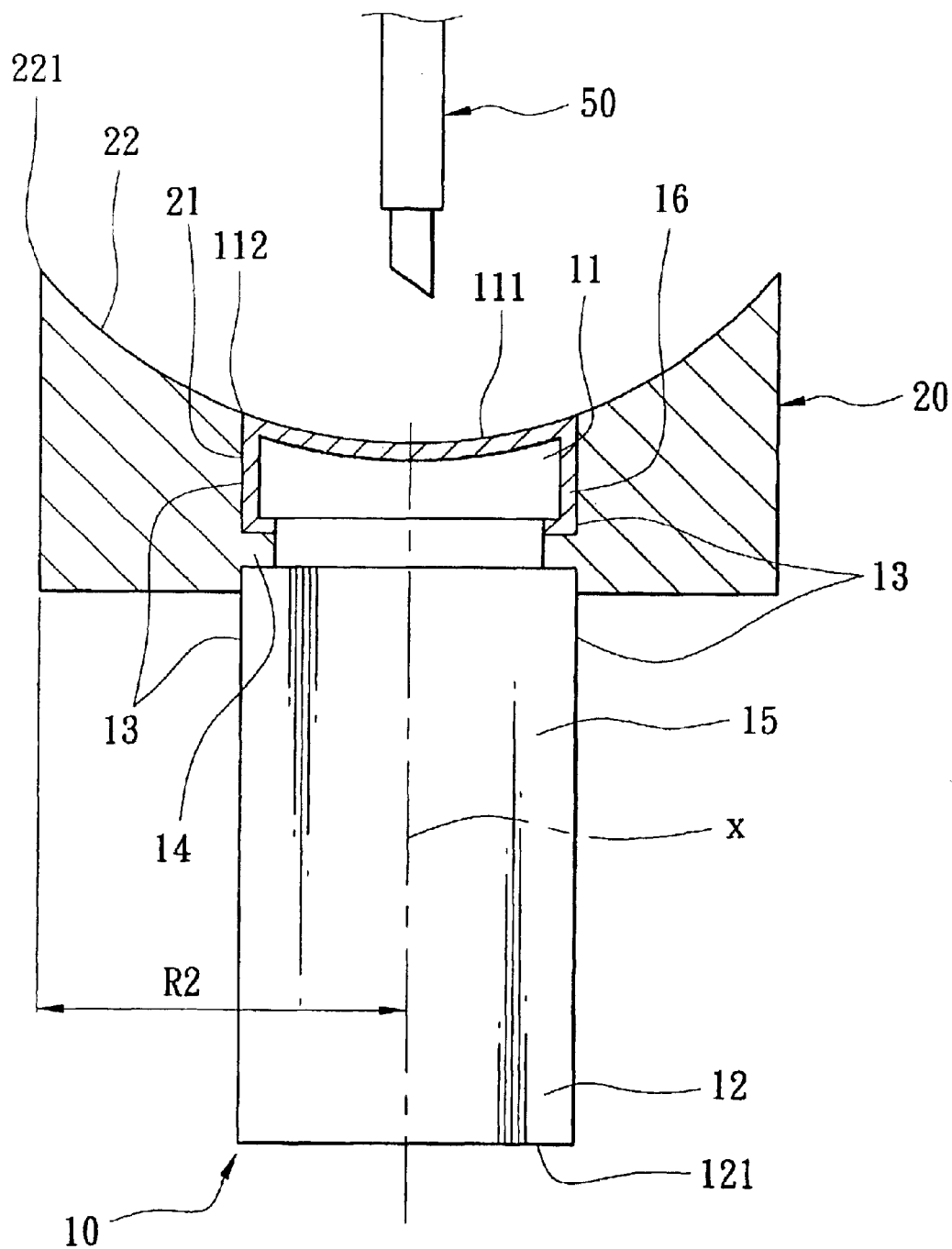
FIG. 5 is a partly sectional view of the post and the filling block in an assembled state.
Figure 6:
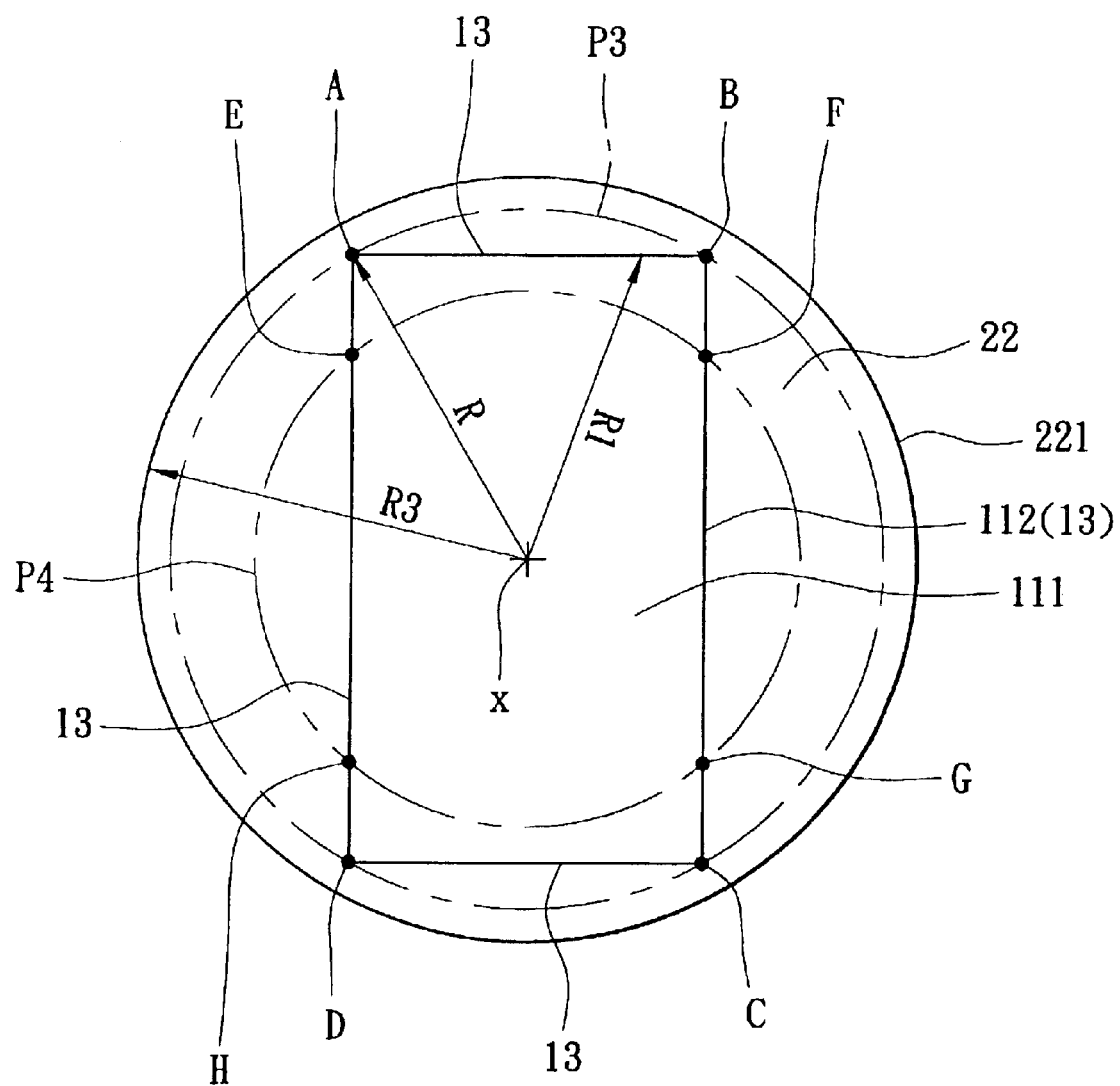
FIG. 6 is a schematic top view of FIG. 5, illustrating the circular tracks of a cutter along the surfaces of the post and the filling block.

Before the present invention is described in detail, it should be noted that similar elements are denoted by the same reference numerals throughout the disclosure.

Referring to FIGS. 3 to 6, the first embodiment of a process for finishing an end surface of a non-circular post according to the present invention includes the steps of providing a workpiece 10 having a first end 11 with a first end surface 111, mounting a filling block 20 around the first end 11 of the workpiece 10, surface-finishing the first end surface 111 of the workpiece 10 and an extension end surface 22 (see FIG. 5) of the filling block 20 by using a cutter 50, and removing the filling block 20 from the workpiece 10 by melting down the filling block 20.

The workpiece 10, in this embodiment, is a molding core for forming an optical lens piece, has the first end 11, a second end 12 opposite to the first end 11 along a rotational axis (x), four lateral sides 13 connected between the first and second ends 11, 12, and a neck 14 formed in the lateral sides 13 proximate to the first end 11. The workpiece 10 is composed of a post 15 and a covering layer 16 covering one end of the post 15. The post 15 is made of steel, and the covering layer 16 is a hard film formed on the first end 11 of the workpiece 10. The hard film is made of an electroless plated nickel layer with a hardness range of HRA85~90. A first peripheral edge 112 forms between the first end surface 111 of the first end 11 and the lateral sides 13 (see FIG. 5). The first end surface 111, in this embodiment, is a concave surface, and the second end 12 has a second end surface 121. A reference radius (R) equal to the largest distance from the first peripheral edge 112 to the rotational axis (x) is obtained. The cutter 50 finishes the first end surface 111 according to a circular track (P3) (see FIG. 6) around the rotational axis (x). The distance (R1) from the first peripheral edge 112 to the rotational axis (x) is not greater than the reference radius (R) (see FIG. 6).

In this embodiment, the material of the filling block 20 is a low-temperature alloy, and has a melting point lower than the melting point of the workpiece 10. For example, a low-temperature alloy constituted by Bi, Pb, Cd, In, and Sn has a melting point of about 85° C. The workpiece 10 is initially inserted into a non-circular hole 41 of a first mold 40, and then a second mold 30 is brought into contact with the first mold 40. Afterwards, the material of the filling block 20 casts into a mold cavity 42 enclosed by the first mold 40 and the second mold 30. After the mold is opened, the filling block 20 covers the first end 11 of the workpiece 10, and tightly engages the neck 14. Thus, the filling block 20 has an inner side-wall 21 that is fitted tightly to the lateral sides 13 of the workpiece 10, and the extension end surface 22 that extends continuously and outwardly from and around the first peripheral edge 112 and that faces in the same direction as the first end surface 111 of the workpiece 10. The distance between the extension end surface 22 and the second end surface 121 is not smaller than the distance between the first end surface 111 and the second end surface 121. The extension end surface 22 has a second peripheral edge 221. A distance (R2) from the rotational axis (x) to each point on the second peripheral edge 221 is not smaller than the reference radius (R) (see FIGS. 5 and 6). In this embodiment, the distance (R2) is larger than the reference radius (R).

The workpiece 10 is then driven to revolve around the rotational axis (x), and the cutter 50 is brought close to finish the first end surface 11 of the workpiece 10 and the extension end surface 22 of the filling block 20, which are at least covered by an area bounded by the circular track (P3).

After surface-finishing of the first end surface 111 of the workpiece 10 has been accomplished, the filling block 20 is removed from the workpiece 10 by placing the workpiece 10 and the filling block 20 in an environment having a temperature higher than the melting point of the filling block 20, thereby melting down the filling block 20, and thereby separating the filling block 20 from the workpiece 10. In this embodiment, a liquid having a temperature higher than the melting point of the filling block 20, such as boiling water, can be used to melt the filling block 20 so as to remove the filling block 20 from the workpiece 10.

Thus, the first end surface 111 of the workpiece 10 is formed with a high accuracy of surface precision, and can be used for producing a highly accurate and precise optical lens piece.

From the above description of the first preferred embodiment, some of the advantages of the process of the present invention can be summarized as follows:

Referring once again to FIGS. 5 and 6, when the cutter 50 finishes the first end surface 111 of the workpiece 10, even if a circular track (P4) of the cutter 50 exceeds the boundary of the peripheral edge 112 and intersects the same, or even if the cutter 50 moves along the circular track (P3), the cutter 50 cannot hit or move swiftly away from the lateral sides 13 since the extension end surface 22 of the filling block 20 extends continuously and outwardly from the first end surface 111 of the workpiece 10 to the second peripheral edge 221 of the filling block 20, which is not smaller than the circular track (P3). Furthermore, the extension end surface 22 of the filling block 20 serves to fill in and cover the originally non-continuous circular track of the cutter 50 so that when the cutter 50 intersects the first peripheral edge 112 at a circular track point, such as circular track points A to H, the cutter 50 is prevented from hitting or moving swiftly away from the lateral sides 13, and can continuously finish from the extension end surface 22 of the filling block 20 to the first end surface 111 of the workpiece 10. Thus, in the first preferred embodiment of the process of the present invention, the cutter 50 and the first peripheral edge 112 of the workpiece 10 are prevented from being damaged so that the first end surface 111, after finishing, has a good surface precision.

Figure 7:
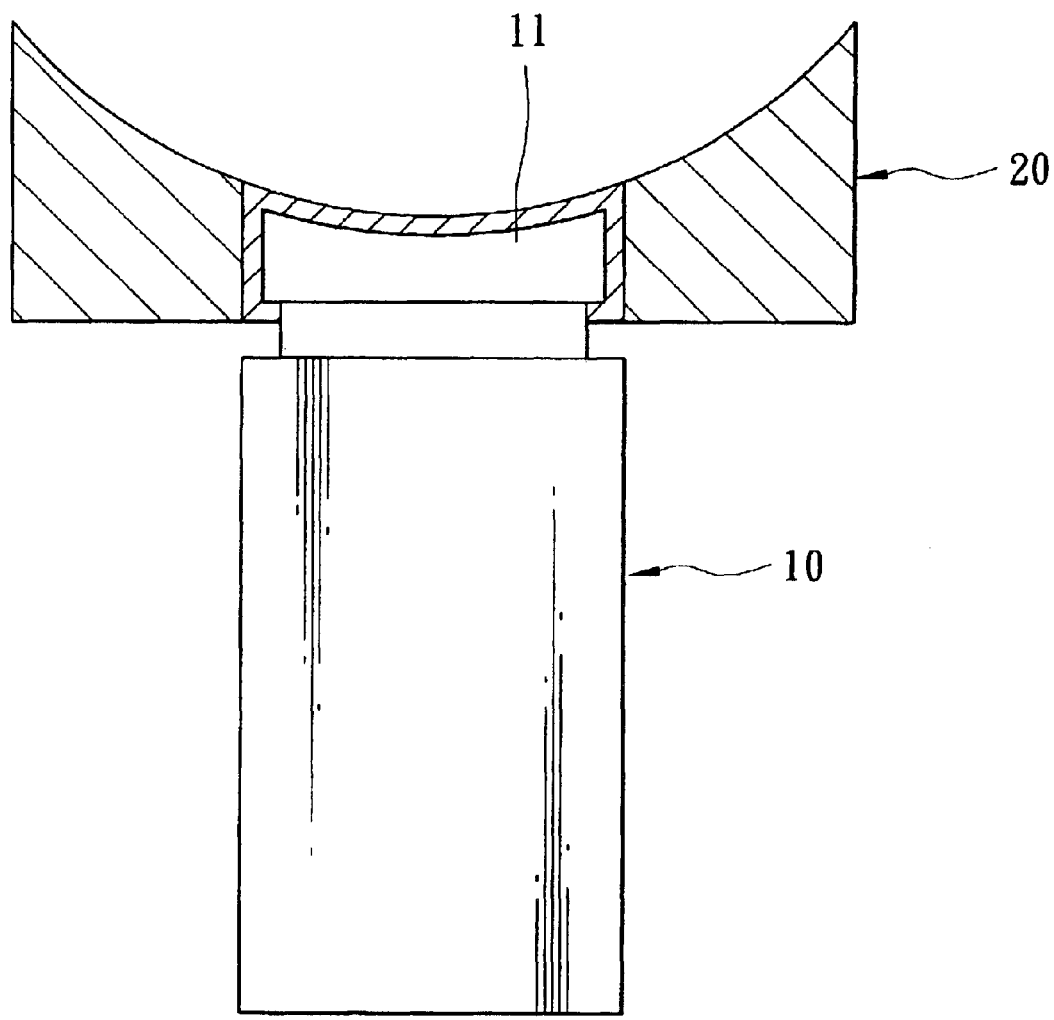
FIG. 7 is a sectional view of a filling block and a workpiece of the second preferred embodiment of a process for finishing an end surface of a non-circular post according to the present invention.

Referring to FIG. 7, the second embodiment of the invention shows another process for finishing an end surface of a non-circular post, wherein it is substantially similar to the first embodiment. The main difference between the first and second embodiments resides in that the filling block 20 is press-fitted on the first end 11 of the workpiece 10. In addition, the inner side-wall of the filling block 20 does not enclose the neck of the workpiece 10. The advantages of the first embodiment can be similarly attained using the second embodiment.

Figure 8:
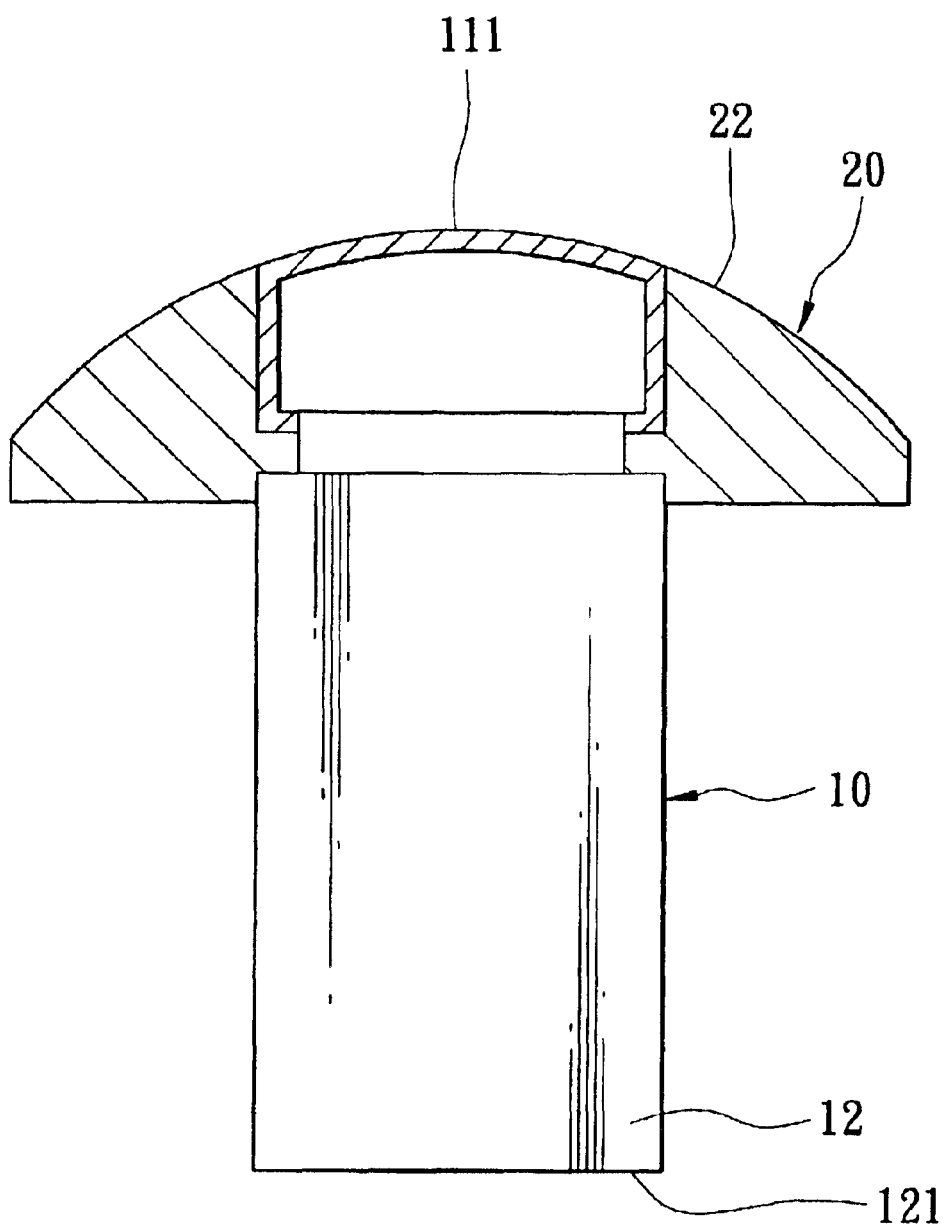
FIG. 8 is a sectional view illustrating a filling block and a workpiece, both of which are convexed.

Referring to FIG. 8, the first end surface 111 of the workpiece 10 is a convex surface. The distance between the extension end surface 22 of the filling block 20 and the second end surface 121 of the workpiece 10 is not greater than the distance between the first end surface 111 and the second end surface 121 of the workpiece 10.

From the above description of the embodiments of the present invention, the occurrence of the non-continuous circular track of the cutter 50 on the first end surface 111 of the workpiece 10 is prevented, and the first end surface 111 is finished to have a good surface precision. Furthermore, the cutter 50 is prevented from hitting the lateral sides 13 of the workpiece 10 that causes chipping and damages to the cutter 50. Moreover, the filling block 20 used in the present invention can be recycled after being removed from the workpiece 10 so as not to increase the production costs. Thus, the object of the present invention is achieved.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A process for finishing an end surface of a non-circular post, comprising:

providing a workpiece, said workpiece having a first end, a second end opposite to said first end along a rotational axis, and a plurality of lateral sides connected between said first and second ends, said first end having a first end surface connected to said lateral sides to form therebetween a first peripheral edge, which defines a reference radius, said reference radius being equal to the largest distance from said first peripheral edge to said rotational axis;

mounting a filling block around said first end of said workpiece, said filling block having an inner side-wall that is fitted tightly to said lateral sides of said workpiece, and an extension end surface that extends continuously and outwardly from and around said first peripheral edge and that faces in the same direction as said first end surface, said extension end surface lying flush with said first end surface and having a second peripheral edge, a distance from said rotational axis to said second peripheral edge being not smaller than said reference radius; and surface-finishing said first end surface of said workpiece and said extension end surface of said filling block, which are at least covered by an area bounded by a circular track, by using a cutter.

2. The process as claimed in claim 1, wherein the material of said filling block is a low-temperature alloy, and the melting point of said filling block is lower than that of said workpiece.

3. The process as claimed in claim 2, wherein said filling block is cast around said first end of said workpiece, and is connected tightly to said lateral sides of said workpiece.

4. The process as claimed in claim 3, further comprising the step of removing said filling block from said workpiece by melting down said filling block.

5. The process as claimed in claim 4, wherein a liquid having a temperature higher than the melting point of said filling block is used to melt said filling block.

6. The process as claimed in claim 1, wherein said workpiece is composed of a post and a covering layer covering one end of said post, and said first end surface of said workpiece is formed on said covering layer.

7. The process as claimed in claim 1, wherein said first end surface of said workpiece is a convex surface, said second end having a second end surface, the distance between said extension end surface of said filling block and said second end surface of said workpiece being not greater than the distance between said first end surface and said second end surface of said workpiece.

8. The process as claimed in claim 1, wherein said first end surface of said workpiece is a concave surface, said second end having a second end surface, the distance between said extension end surface of said filling block and said second end surface of said workpiece being not smaller than the distance between said first end surface and said second end surface of said workpiece.

9. A process for finishing an end surface of a non-circular post, comprising:

providing a workpiece, said workpiece including a post, a covering layer covering one end of said post, a first end, a second end opposite to said first end along a rotational axis, and a plurality of lateral sides connected between said first and second ends, said first end having a first end surface formed on said covering layer, said first end surface being connected to said lateral sides to form therebetween a first peripheral edge, which defines a reference radius, said reference radius being equal to the largest distance from said first peripheral edge to said rotational axis;

mounting a filling block around said first end of said workpiece, said filling block having an inner side-wall that is fitted tightly to said lateral sides of said workpiece, and an extension end surface that extends continuously and outwardly from and around said first peripheral edge and that faces in the same direction as said first end surface, said extension end surface lying flush with said first end surface and having a second peripheral edge, a distance from said rotational axis to said second peripheral edge being not smaller than said reference radius;

surface-finishing said first end surface and said extension end surface, which are at least covered by an area bounded by a circular track, by using a cutter; and removing said filling block from said workpiece by melting down said filling block.

10. The process as claimed in claim 9, wherein the material of said filling block is a low-temperature alloy, and the melting point of said filling block is lower than that of said workpiece.

11. The process as claimed in claim 10, wherein said filling block is cast around said first end of said workpiece, and is connected tightly to said lateral sides of said workpiece.

12. The process as claimed in claim 11, further comprising the step of using a liquid having a temperature higher than the melting point of said filling block to melt said filling block.

13. The process as claimed in claim 9, wherein said first end surface of said workpiece is a convex surface, said second end having a second end surface, the distance between said extension end surface of said filling block and said second end surface of said workpiece being not greater than the distance between said first end surface and said second end surface of said workpiece.

14. The process as claimed in claim 9, wherein said first end surface of said workpiece is a concave surface, said second end having a second end surface, the distance between said extension end surface of said filling block and said second end surface of said workpiece being not smaller than the distance between said first end surface and said second end surface of said workpiece.

* * * * *